United States Patent [19]

Garner et al.

[11] 4,179,546

[45] Dec. 18, 1979

[54] METHOD FOR EXPANDING MICROSPHERES AND EXPANDABLE COMPOSITION

[75] Inventors: Joseph L. Garner, Sanford; Peter A. Tiffany, Midland, both of Mich.

[73] Assignee: The Dow Chemical Company, Midland, Mich.

[21] Appl. No.: 505,298

[22] Filed: Sep. 12, 1974

Related U.S. Application Data

[63] Continuation of Ser. No. 284,175, Aug. 28, 1972, abandoned.

[51] Int. Cl.² ............................ C08J 9/12; B01J 13/02
[52] U.S. Cl. ........................................ 521/56; 252/316
[58] Field of Search ...................... 252/316; 427/212; 260/2.5 B; 521/56

[56] References Cited

U.S. PATENT DOCUMENTS

| | | | |
|---|---|---|---|
| 2,969,330 | 1/1961 | Brynko | 252/316 |
| 3,069,370 | 12/1962 | Jensen et al. | 252/316 X |
| 3,359,130 | 12/1967 | Goldman | 260/2.5 B X |
| 3,556,934 | 1/1971 | Meyer | 252/316 X |
| 3,615,972 | 10/1971 | Morehouse, Jr. et al. | 156/79 |

OTHER PUBLICATIONS

Brandrup et al.: Polymer Handbook, Interscience Publ., (1966), p. V-6.
Billmeyer, Jr.; Textbook of Polymer Science, John Wiley & Sons, Inc., (1962), p. 405.
Encyclopedia of Polymer Science and Technology, John Wiley & Sons, Inc., (1969), vol. 10, pp. 260 and 287.
Kirk-Othmer's Encyclopedia of Chemical Technology, Interscience Encyclopedia, Inc., New York, (1951), vol. 7, pp. 729-731.

*Primary Examiner*—Richard D. Lovering

[57] ABSTRACT

Thermoplastic microspheres are readily expanded to low densities by heating in water in the presence of hydrogen peroxide.

6 Claims, No Drawings

METHOD FOR EXPANDING MICROSPHERES AND EXPANDABLE COMPOSITION

CROSS REFERENCE TO RELATED APPLICATION

This is a continuation of application Ser. No. 284,175, filed Aug. 28, 1972 and now abandoned.

Expandable synthetic resinous microspheres provide a convenient source of hollow, gas-filled synthetic resinous particles and are beneficially employed as fillers in synthetic resinous castings as bulking agents, in textiles and paper as thin insulating coatings and the like. Such expandable particles are well known and are set forth in U.S. Letters Pat. Nos. 3,293,114; 3,401,475; 3,479,811; 3,488,714; 3,615,972; Canadian Pat. No. 890,501 and British Pat. No. 1,044,680. Expandable microspheres generally have diameters within the range of from 1 to 50 microns and consist essentially of a synthetic resinous thermoplastic shell encapsulating therein a single droplet of a liquid expanding agent such as a low boiling hydrocarbon or other volatile material which is generally a non-solvent for the polymer. On heating the expandable microspheres to a temperature sufficient to cause heat plastification of the shell, the microspheres expand to form a hollow gas or vapor-filled polymeric shell several times the diameter of the unexpanded sphere. Such microspheres are prepared in an aqueous polymerization system and oftentimes dried and expanded. In many instances, particularly where such microspheres are being employed in an aqueous system such as a coating system where it is desired to employ the microspheres in the expanded form, substantial difficulty has been encountered in obtaining satisfactorily expanded microspheres when they are heated in the presence of water. Generally, when microspheres are employed which expand at temperatures below the boiling point of water, an undesirably low degree of expansion is obtained if water-wetted microspheres are heated in water. If the water is removed; that is, the microspheres dried and re-slurried and heated to a like temperature within a short period of time, generally a substantially greater degree of expansion is obtained. On standing at room temperature in the presence of water, the dried and re-slurried microspheres appear to lose their ability to expand in hot water.

It would be desirable if there were available an improved method for the preparation of thermoplastic expandable microspheres in the presence of water.

It would also be desirable if there were available an improved microsphere-containing aqueous composition which would readily permit expansion of the microspheres.

It would further be desirable if there were available a simple and direct technique for the expansion of expandable microspheres in the presence of water to relatively low densities.

These benefits and other advantages in accordance with the present invention are achieved employing an aqueous mass of expandable synthetic resinous microspheres, the microspheres having a thermoplastic shell symmetrically encapsulating therein a volatile liquid raising agent in an aqueous dispersing medium, the aqueous dispersing medium having dissolved therein from about 0.2 to 5 weight percent, based on the weight of the microspheres, of hydrogen peroxide.

Also contemplated within the scope of the invention is a method for the expansion of expandable synthetic resinous microspheres, the microspheres having a synthetic resinous thermoplastic shell symmetrically encapsulating therein a volatile liquid raising agent and on heating being capable of expanding to form a monocellular particle, the steps of the method comprising providing a mass of expandable microspheres in an aqueous medium, the aqueous medium having dissolved therein from about 0.2 to 5 weight percent, based on the weight of the microspheres, of hydrogen peroxide.

A wide variety of expandable synthetic resinous microspheres may be employed in the practice of the present invention. Those which are suitable are any expandable synthetic resinous microspheres which heat plastify and expand below the boiling point of water. Typical microspheres are those having a shell of a copolymer of 75 weight percent vinylidene chloride and 25 weight percent acrylonitrile containing about 11 weight percent, based on the total weight of the microspheres, of isobutane; microspheres having a shell of 70 weight percent vinylidene chloride, 15 weight percent acrylonitrile and 15 weight percent methylmethacrylate and containing 14 weight percent isobutane. The expandable microspheres are well known in the art and various microspheres are described in the hereinbefore delineated patents, herewith incorporated by reference thereto.

Generally in the practice of the method of the invention, it is desirable to admix the hydrogen peroxide, water and microspheres by any convenient method and subsequently heat the microspheres to the expanding temperature. It is desirable that at least 3 weight percent of a 35 weight percent solution of hydrogen peroxide in water be present in the aqueous dispersing medium. The temperature of treatment is generally between about 20° C. and a temperature below the expanding temperature of the microspheres. A beneficial range is from about 40° C. to about 70° C. The time of treatment generally varies from 10 minutes to 24 hours. However, greater or lesser time may be employed. Usually when higher temperatures are employed shorter periods of time are required for optimum results. The expandable microspheres may be heated directly in the dispersing medium, or alternately and desirably, the dispersing medium containing the hydrogen peroxide may be removed from the microspheres such as by filtering. Such a filtering operation generally provides a wet cake which contains about equal parts of the microspheres and retained dispersing medium. The microspheres separated by filtration may then be added to water and heated to the desired temperature to cause expansion. Beneficially, in order to obtain microspheres of the lowest possible density on expansion, additional treatment with a water soluble metal salt is desirable. Such treatment may be given before or after treating with hydrogen peroxide or simultaneously with the hydrogen peroxide. Any water soluble metal salt capable of dissolving in water under conditions suitable for treating the microspheres above the freezing point of the salt solution and the expansion point of the microspheres may be employed, provided the salt or mixture of salts is sufficiently soluble in water to provide a value of 0.15 hydrogen equivalents per 100 grams of water. Such salts include ammonium chloride; barium chloride; zinc chloride; magnesium chloride; calcium chloride; ferric chloride; sodium acetate; sodium nitrate; trisodium phosphate; disodium phosphate; monosodium phosphate; potassium phosphate; potassium chloride; sodium hexametaphosphate; potassium chromate; ammonium iodate; barium nitrate and the like. Generally it is desirable to select a more commonly available salt which prevents minimal disposal characteristics dependent on the particular waste control system available. Frequently it is feasible to water-wash the expanded microspheres and recover the salt. Particularly beneficial for many applications are salts such as calcium chloride, sodium chloride and magnesium chloride.

Generally in the practice of the method of the invention, it is desirable to admix the hydrogen peroxide, salt, water and microspheres by any convenient method, such as by spraying the wet filter cake or dispersing the microspheres in the salt solution and subsequently heating the microspheres to the expanding temperature. It is desirable that at least 0.15 hydrogen equivalents of the salt per 100 grams of water be present in the aqueous dispersing or treating medium. The expandable microspheres may be heated directly in the dispersing medium, or alternately and desirably, the dispersing medium containing the salt compound and hydrogen peroxide may be removed from the microspheres such as by filtering. Such a filtering operation generally provides a wet cake which contains about equal parts of the microspheres and retained dispersing medium. The microspheres separated by filtration may then be added to water heated to the desired temperature to cause expansion. If desired, the water may contain binders such as, for example, styrene/butadiene latex particles. Generally in order to obtain optimum expansion, it is advantageous to employ at least 0.4 hydrogen equivalents of the salt per 100 grams of water in treating the expandable microspheres. Usually it is desirable that at room temperature the microspheres remain in the salt-containing dispersion for several hours, such as for a period of from about 5 to 24 hours, or up to several days in order to obtain maximum expansion of the particles. A substantial improvement in expansion characteristics is observed, however, when microspheres are admixed with an aqueous solution of hydrogen peroxide with or without the salt and immediately heated in water.

The mechanism of the present invention is not understood. However, at temperatures below temperatures at which the microspheres expand generally the longer the period of treatment at a given temperature up to about 24 hours, the lower the density of the resultant expanded microspheres.

The following examples are intended to illustrate but not limit the present invention. All densities used in the examples are true densities which are determined gravimetrically at 25° C. using expanded microspheres in glycerine.

EXAMPLE 1

A slurry of expandable microspheres in water is prepared containing 40 weight percent microspheres. To 300 parts by weight of this slurry is added varying quantities of an aqueous solution containing 35 weight percent hydrogen peroxide. The slurry is heated to a temperature of 50° C. for a period of 3.5 hours, subsequently cooled, filtered and air-dried at room temperature. Five parts by weight of the dry peroxide-treated microspheres are added to 300 parts by weight of water at a temperature of 75° C. with vigorous stirring for a period of about 30 seconds. To the resultant slurry is added crushed ice sufficient to lower the water temperature to about ambient temperature. The slurry is filtered and again air-dried. The results set forth in Table I. Run 2 is a control without hydrogen peroxide and Run 5 is heated at 50° C. for a period of time between 3.5 and 5 hours and additionally aged for 20 hours at ambient temperature. The densities shown in Table I are designated under the column ATD (Apparent True Density) and are expressed in pounds per cubic foot.

TABLE I

| Run | % $H_2O_2$ Based on M/S | ATD |
|---|---|---|
| 1 | 0.1 | 9.2 |
| 2 | — | 10.0 |
| 3 | 0.58 | 4.4 |
| 4 | 1.82 BO M/S | 3.3 |
| 5 | 5.3 20 hrs at RT | 5.4 |

EXAMPLE 2

Employing the general procedure of Example 1, the treatment of various samples of microspheres was varied as to treatment, sequence and additions. Foaming and evaluation of apparent true density is carried out as in Example 1. In each case a 50 gram slurry of about 40 percent by weight microspheres is employed from a single polymerization batch. All magnesium chloride used is the hexahydrate form; all hydrogen peroxide used is a 35 percent solution in water. In runs 4–7 the slurry is first filtered and water washed.

Run 1
22.4 grams hydrated magnesium chloride treated at room temperature for one hour; ATD - 7.2 pounds per cubic foot.

Run 2
0.4 gram hydrogen peroxide solution heated to 50° C. for 3.5 hours then admixed with 22.4 grams magnesium chloride; ATD - 9.2 pounds per cubic foot.

Run 3
0.4 gram hydrogen peroxide solution heated for 3.5 hours at 50° C., filtered and re-slurried with 22 grams water and 22.4 grams magnesium chloride; ATD - 6.6 pounds per cubic foot.

Run 4
0.4 gram hydrogen peroxide solution heated for 3.5 hours at 50° C., 22.4 grams magnesium chloride added and foamed after one hour; ATD - 4.9 pounds per cubic foot.

Run 5
0.4 gram hydrogen peroxide stirred 3.5 hours at 50° C., filtered and treated with 21.5 grams water and 22.4 grams magnesium chloride, agitated for one hour and foamed; ATD - 5.6 pounds per cubic foot.

Run 6
22.4 grams magnesium chloride agitated for one hour, 0.4 gram hydrogen peroxide added, heated for 3.5 hours at 50° C. and foamed; ATD - 6.2 pounds per cubic foot.

Run 7
22.4 grams magnesium chloride agitated for one hour, filtered, re-slurried in 21.5 grams water, 0.4 gram hydrogen peroxide added, stirred for 3.5 hours at 50° C. and then foamed; ATD - 6.3 pounds per cubic foot.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An aqueous mass of expandable synthetic resinous microspheres, the microspheres beng expandable to form a monocellular hollow gas filled polymer cell at a temperature below the boiling point of water, the microspheres having a synthetic resinous thermosplastic shell symmetrically encapsulating therein a single droplet of volatile liquid raising agent, the microspheres being in an aqueous dispersing medium, the aqueous dispersing medium having dissolved therein from about 0.2 to 5 weight percent, based on the weight of the microspheres, of hydrogen peroxide.

2. The mass of claim 1 wherein a salt is present in an amount to provide at least 0.15 hydrogen equivalents per 100 grams of water.

3. An aqueous mass of expandable synthetic resinous microspheres, the microspheres being expandable to form a monocellular hollow gas filled polymer cell at a temperature below the boiling point of water, the microspheres having a thermoplastic shell of a polymer containing vinylidene chloride, the shell symmetrically encapsulating therein a single droplet of volatile liquid raising agent, the microspheres being in an aqueous dispersing medium, the aqueous dispersing medium having dissolved therein from about 0.2 to 5 weight percent, based on the weight of the microspheres, of hydrogen peroxide.

4. A method for the expansion of expandable synthetic resinous microspheres, the microspheres having a synthetic resinous thermoplastic shell symmetrically encapsulating therein a single droplet of a volatile liquid raising agent and on heating being capable of expanding to form a hollow gas filled polymeric monocellular particle, the steps of the method comprising providing a mass of expandable microspheres in an aqueous medium, adding to and dissolving in the aqueous medium from about 0.2 to 5 weight percent, based of the weight of the microspheres, of hydrogen peroxide and subsequently heating the aqueous medium to a temperature below the boiling point of water to cause the microspheres to expand to form monocellular gas filled particles.

5. The method of claim 4 including the step of adding a salt in an amount to provide at least 0.15 hydrogen equivalents per 100 grams of water.

6. A method for the expansion of expandable synthetic resinous microspheres, the microspheres having a synthetic resinous thermoplastic shell of a polymer containing vinylidene chloride symmetrically encapsulating therein a single droplet of a volatile liquid raising agent and on heating being capable of expanding to form a hollow gas filled polymeric monocellular particle, the steps of the method comprising providing a mass of expandable microspheres in an aqueous medium, dissolving in the aqueous medium from about 0.2 to 5 weight percent, based on the weight of the microspheres, of hydrogen peroxide and subsequently heating the medium and microspheres to a temperature below the boiling point of water to cause the microspheres to expand and form hollow monocellular gas filled particles.

* * * * *